(12) United States Patent
Hong et al.

(10) Patent No.: US 8,395,915 B2
(45) Date of Patent: Mar. 12, 2013

(54) DC/DC CONVERTER

(75) Inventors: Young Gun Hong, Seoul (KR); Young Joo Kim, Suwon-si (KR); Hyun Jung Kim, Seoul (KR); Dong Seong Oh, Incheon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 273 days.

(21) Appl. No.: 12/128,297

(22) Filed: May 28, 2008

(65) Prior Publication Data

US 2009/0141519 A1    Jun. 4, 2009

(30) Foreign Application Priority Data

Nov. 29, 2007  (KR) .................. 10-2007-0122849

(51) Int. Cl.
*H02J 1/10* (2006.01)
*H02M 3/335* (2006.01)

(52) U.S. Cl. ............... 363/65; 363/21.04; 363/21.12

(58) Field of Classification Search ............... 363/21.04, 363/21.08, 21.09, 21.12, 21.16, 21.17, 65, 363/67, 101, 259
See application file for complete search history.

(56) References Cited

U.S. PATENT DOCUMENTS

| 4,680,688 | A |   | 7/1987  | Inou et al. |
| 5,999,433 | A | * | 12/1999 | Hua et al. ...................... 363/132 |
| 6,829,151 | B2 | * | 12/2004 | Elferich et al. ................. 363/17 |
| 2004/0032239 | A1 |   | 2/2004 | Steigerwald et al. |
| 2004/0042237 | A1 | * | 3/2004 | Hsieh .......................... 363/21.08 |
| 2005/0088858 | A1 | * | 4/2005 | Kogel et al. ...................... 363/22 |
| 2005/0280404 | A1 | * | 12/2005 | LeFevre .......................... 323/282 |
| 2006/0043909 | A1 | * | 3/2006 | Hwang et al. .................. 315/276 |

FOREIGN PATENT DOCUMENTS

| CN | 85107730       | 8/1986  |
| JP | 03177930       | 8/1991  |
| JP | 07250470       | 9/1995  |
| JP | 11-129725 A    | 5/1999  |
| JP | 2000217356     | 8/2000  |
| JP | 2000308345     | 11/2000 |
| JP | 2001-128454 A  | 5/2001  |
| KR | 1020000050858  | 5/2000  |

OTHER PUBLICATIONS

Hernandez et al., "Comparative Analysis of Boost and Buck-Boost Derived Topologies used as Power Factor Correctors", 1995, IEEE.*
National Semiconductor, "Switching Regulator", Aug. 17, 2000, National Semiconductor.*
Hernandez et al. "Comparative Analysis of Boost and Buck-Boost Derived Topologies used as Power Factor Correctors", 1995, IEEE.*
Chinese Office Action for Application No. CN200810108595.7 mailed Oct. 17, 2011.

* cited by examiner

*Primary Examiner* — Adolf Berhane
*Assistant Examiner* — Jeffrey Gblende
(74) *Attorney, Agent, or Firm* — Lowe Hauptman Ham & Berner, LLP (57) ABSTRACT

Provided is a DC/DC converter including a power supply unit that includes a transformer having one primary side and a plurality of secondary sides and outputs a plurality of driving voltages for driving a load; and a constant current converting unit that is connected to one secondary side and a low-voltage stage of another secondary side adjacent to the one secondary side among the plurality of secondary sides of the transformer and boosts a driving voltage output from the one secondary side.

14 Claims, 10 Drawing Sheets

DC/DC CONVERTER

CROSS-REFERENCE TO RELATED APPLICATIONS

This application claims the benefit of Korean Patent Application No. 10-2007-0122849 filed with the Korea Intellectual Property Office on Nov. 29, 2007, the disclosure of which is incorporated herein by reference.

BACKGROUND OF THE INVENTION

1. Field of the Invention

The present invention relates to a DC/DC converter which reduces the breakdown voltage of elements.

2. Description of the Related Art

In general, power conversion systems are divided into converters and inverters. The converters serve to convert an AC input voltage into a DC voltage, and the inverters serve to convert a DC input voltage into an AC voltage.

Such power conversion systems are used to supply power to electric motors, lighting equipments, communication devices and so on. The power conversion systems control a voltage, supplied through a transformer, to a predetermined magnitude of voltage so as to drive the devices.

In particular, light emitting diodes (LED) are used for delivering a variety of signals in electronic products such as communication devices, TVs, monitors and so on. The LEDs used for delivering signals emit lights when an applied voltage is higher than a threshold voltage, and do not emit lights when an applied voltage is lower than the threshold voltage.

Recently, white LEDs have been developed, which have higher lighting efficiency than incandescent lamps. Accordingly, studies for substituting incandescent lamps and fluorescent lamps with LEDs are being conducted. Further, as for LEDs for lighting, high-brightness LEDs should be used, in which a large amount of current can flow and which can emit bright lights, unlike LEDs for signal delivery.

To obtain brightness required for such a lighting specification, a large number of LEDs should be arranged in series or in parallel to each other. In this case, when the LEDs are arranged in series, a plurality of driving voltages corresponding to the number of LEDs are needed. Accordingly, high driving voltages are required to obtain high brightness. As a result, the breakdown voltage of elements increases.

Hereinafter, a conventional DC/DC converter will be described with reference to FIGS. 1 to 3.

Figure 1:
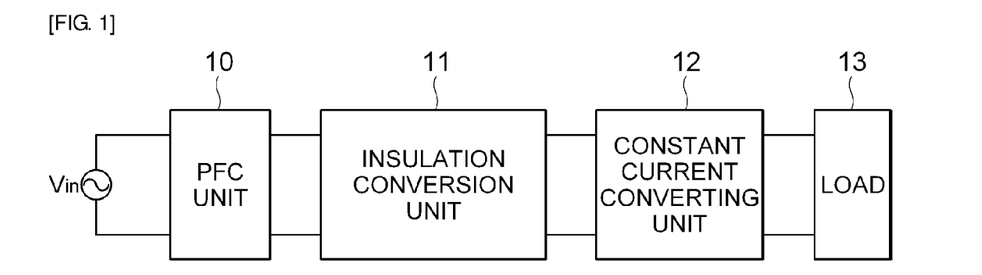
FIG. 1 is a block diagram of a conventional DC/DC converter.

FIG. 1 is a block diagram of a conventional DC/DC converter. FIGS. 2 and 3 are block diagrams of modifications of the conventional DC/DC converter of FIG. 1.

As shown in FIG. 1, the conventional DC/DC converter includes a power factor correction (PFC) unit 10 which reduces harmonics of input voltages and a power loss, an insulation conversion unit 11 connected to the PFC unit 10, a constant current converting unit 12 which controls a driving voltage, output from the insulation conversion unit 11, to a predetermined magnitude, and then outputs the controlled driving voltage, and a load 13 which operates by receiving the driving voltage output through the constant current converting unit 12.

In this case, the conventional DC/DC converter can correct a power factor through the PFC unit 10. However, to satisfy safety standards, the insulation conversion unit 11 is required. The insulation conversion unit 11 converts a voltage, output from the PFC unit 10, into a DC voltage for driving the load, and then outputs the converted voltage. Further, the constant current converting unit 12 controls the driving voltage output through the insulation conversion unit 11 such that a constant current flows, thereby driving the load 13.

Figure 2:
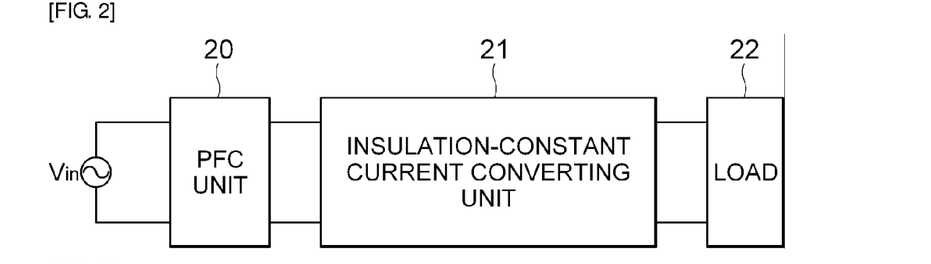
FIGS. 2 and 3 are block diagrams of modifications of the conventional DC/DC converter of FIG. 1.

As shown in FIG. 2, the insulation conversion unit 11 and the constant current converting unit 12 may be combined as one insulation-constant current conversion unit 21. Alternatively, as shown in FIG. 3, the PFC unit 10 and the insulation conversion unit 11 may be combined as one power supply unit 30.

However, the conventional DC/DC converter has the following problems.

In the conventional DC/DC converter, the driving voltage output from the insulation conversion unit 11 is supplied to the constant current converting unit 12, and the constant current converting unit 12 controls the supplied driving voltage to deliver to the load 13. In this case, when the number of LEDs provided in the load 13 is increased, the magnitude of the driving voltage for driving the load 13 should be increased.

Accordingly, the insulation conversion unit 11 outputs a driving voltage with a large magnitude, and the constant current converting unit 12 having received the driving voltage should boost the received driving voltage to output. Therefore, the breakdown voltage of elements (not shown) composing the constant current converting unit 12 increases.

Further, when the breakdown voltage of the elements composing the constant current converting unit 12 increases, the size of the elements increases. Accordingly, the sizes of the constant current converting unit 12 and the DC/DC converter increase, and a manufacturing cost increases.

SUMMARY OF THE INVENTION

An advantage of the present invention is that it provides a DC/DC converter, in which a constant current converting unit is connected to any one driving voltage among a plurality of driving voltages output from a power supply unit, and secondary sides of a transformer which outputs the plurality of driving voltages are connected in series, thereby reducing the breakdown voltage of elements provided in the constant current converting unit.

Additional aspects and advantages of the present general inventive concept will be set forth in part in the description which follows and, in part, will be obvious from the description, or may be learned by practice of the general inventive concept.

According to an aspect of the invention, a DC/DC converter comprises a power supply unit that includes a transformer having one primary side and a plurality of secondary sides and outputs a plurality of driving voltages for driving a load; and a constant current converting unit that is connected to one secondary side and a low-voltage stage of another secondary side adjacent to the one secondary side among the plurality of secondary sides of the transformer and boosts a driving voltage output from the one secondary side.

The DC/DC converter further comprises a driving control unit that controls the power supply unit and the constant current converting unit so as to drive or stop the load.

The driving control unit may deliver first and second driving control signals for controlling the power supply unit and the constant current converting unit to the power supply unit and the constant current converting unit, respectively, so as to stop the driving of the load.

When the second driving control signal for stopping the driving of the load is delivered from the driving control unit, the constant current converting unit may block the driving voltage supplied from the power supply unit.

When the second driving control signal for driving the load is delivered from the driving control unit, the constant current converting unit may boost and output the driving voltage supplied from the power supply unit.

The power supply unit may be composed of any one selected from a flyback converter, a forward converter, a half-bridge converter, a full-bridge converter, and a push-full converter.

The constant current converting unit may be composed of any one of a boost converter, a buck converter, a buck-boost converter, a sepic converter, and a Cuk converter.

The boost converter may include an inductor having one end connected to a high-voltage stage of the one secondary side among the secondary sides of the transformer; a switching element having a drain connected to the other end of the inductor and a source grounded; a rectifying diode having an anode connected to the drain of the switching element; a smoothing capacitor having one end connected to a contact between a low-voltage stage of the adjacent secondary side among the secondary sides of the transformer and a cathode of the rectifying diode and the other end grounded; and a switching control section which is connected to the gate of the switching element and receives a current flowing in the load so as to turn on/off the switching element.

The buck converter may include a switching element having a source connected to a high-voltage stage of the one secondary side among the secondary sides of the transformer; a rectifying diode having an anode grounded and a cathode connected to the drain of the switching element; an inductor having one end connected to a contact between the drain of the switching element and the cathode of the rectifying diode; a smoothing capacitor having one end connected to a contact between a low-voltage stage of the adjacent secondary side among the secondary sides of the transformer and the other end of the inductor and the other end grounded; and a switching control section which is connected to the gate of the switching element and receives a current flowing in the load so as to turn on/off the switching element.

The buck-boost converter may include a switching element having a source connected to a high-voltage stage of the one secondary side among the secondary sides of the transformer; an inductor having one end connected to the drain of the switching element and the other end grounded; a rectifying diode having a cathode connected to the one end of the inductor; a smoothing capacitor having one end connected to a contact between a low-voltage stage of the adjacent secondary side among the secondary sides of the transformer and the anode of the rectifying diode and the other end grounded; and a switching control section which is connected to the gate of the switching element and receives a current flowing in the load so as to turn on/off the switching element.

The sepic converter may include a first inductor having one end connected to a high-voltage stage of the one secondary side among the secondary sides of the transformer; a switching element having a source connected to the other end of the first inductor and a drain grounded; a capacitor having one end connected to a contact between the other end of the first inductor and the source of the switching element; a second inductor having one end connected to the other end of the capacitor and the other end grounded; a rectifying diode having an anode connected to a contact between the one end of the second inductor and the other end of the capacitor; a smoothing capacitor having one end connected to the cathode of the rectifying diode and the other end grounded; and a switching control section which is connected to the gate of the switching element and receives a current flowing in the load so as to turn on/off the switching element.

The Cuk converter may include a first inductor having one end connected to a high-voltage stage of the one secondary side among the secondary sides of the transformer; a switching element having a source connected to the other end of the first inductor and a drain grounded; a capacitor having one end connected to a contact between the other end of the first inductor and the source of the switching element; a rectifying diode having an anode connected to the other end of the capacitor and a cathode grounded; a second inductor having one end connected to a contact between the one end of the second inductor and the anode of the rectifying diode; a smoothing capacitor having one end connected to the other end of the second inductor and the other end grounded; and a switching control section which is connected to the gate of the switching element and receives a current flowing in the load so as to turn on/off the switching element.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a DC/DC converter for reducing a breakdown voltage according to the present invention will be described in detail with reference to the accompanying drawings.

Embodiment

Figure 4:
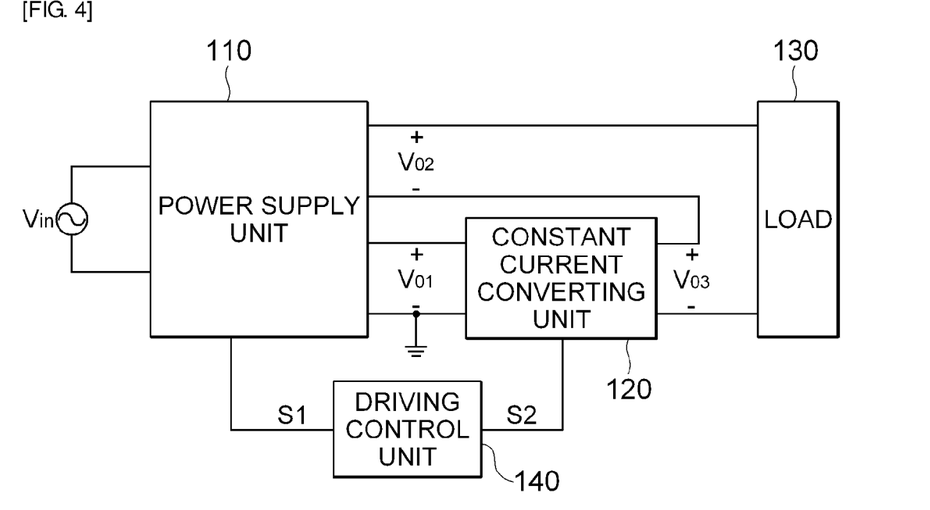
FIG. 4 is a block diagram of a DC/DC converter according to the invention.
Figure 5:
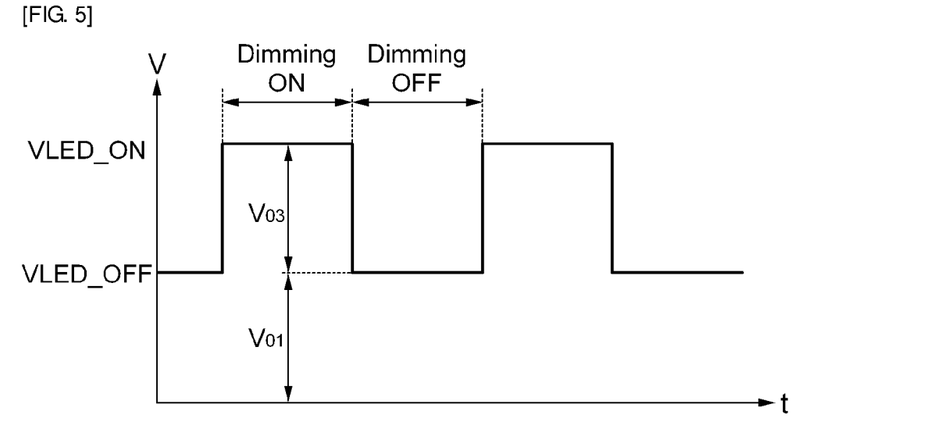
FIG. 5 is a timing chart showing the dimming mode of the DC/DC converter according to the invention.
Figure 6:
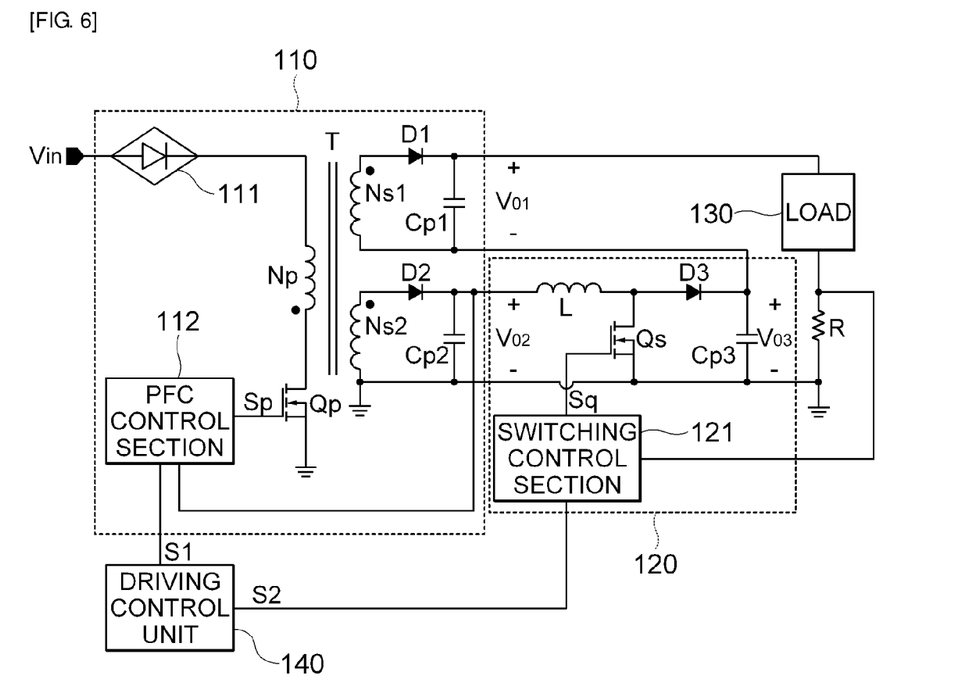
FIG. 6 is a circuit diagram of the DC/DC converter according to the invention.
Figure 7A:
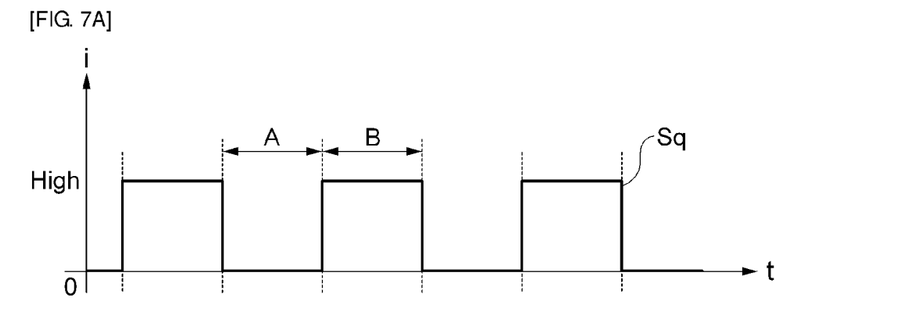
FIGS. 7A and 7B are operation timing charts of the DC/DC converter according to the invention.
Figure 7B:
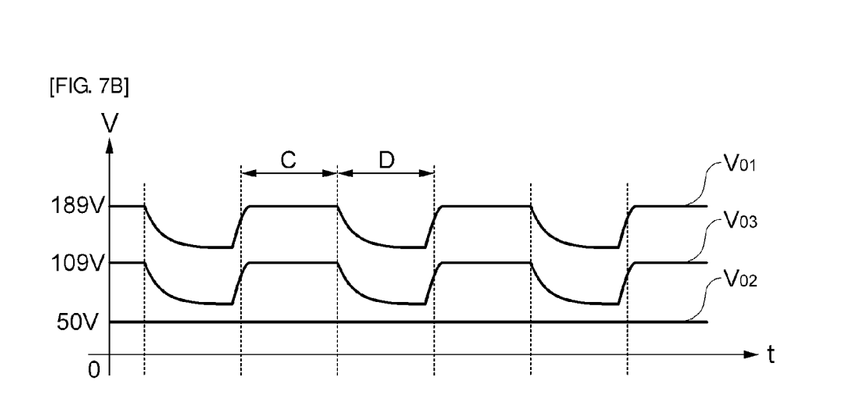

FIG. 4 is a block diagram of a DC/DC converter according to the invention. FIG. 5 is a timing chart showing the dimming mode of the DC/DC converter according to the invention. FIG. 6 is a circuit diagram of the DC/DC converter according to the invention. FIGS. 7A and 7B are operation timing charts of the DC/DC converter according to the invention.

As shown in FIG. 4, the DC/DC converter for reducing a breakdown voltage according to the invention includes a power supply unit 110 which receives an AC input voltage Vin from outside to output as first and second DC driving voltages Vo1 and Vo2 and a constant current converting unit 120 which boosts the second driving voltage Vo2 supplied from the power supply unit 110 so as to output a third driving voltage Vo3. A load 130 connected to the power supply unit 110 and the constant current converting unit 120 is driven by receiving the first driving voltage Vo1 supplied from the power supply unit 110 and the third driving voltage Vo3 output from the constant current converting unit 120.

The DC/DC converter according to the invention further includes a driving control unit 140 for selectively controlling the driving of the load 130. The driving control unit 140 can control the driving time of the load 130 by controlling the power supply unit 110 and the constant current converting unit 120.

For example, as shown in FIG. 5, when the dimming time is desired to be controlled in case where the load 130 is composed of LEDs, the driving control unit 140 outputs first and second driving control signals S1 and S2 for driving both of the power supply unit 110 and the constant current converting unit 120 at a dimming-ON interval, and outputs first and second driving control signals S1 and S2 for driving the power supply unit 110 and stopping the constant current converting unit 120 at a dimming-OFF interval.

At the dimming-ON interval, the power supply unit 110 and the constant current converting unit 120 are driven by the first and second control signals S1 and S2 for driving the power supply unit 110 and the constant current converting unit 120, and the load 130 is normally driven by receiving the first driving voltage Vo1 and the third driving voltage Vo3 obtained by boosting the second driving voltage Vo2.

At the dimming-OFF interval, the constant current converting unit 120 is stopped by the first and second driving control signals S1 and S2 for driving only the power supply unit 110 and stopping the constant current converting unit 120. Accordingly, the load 130 receives the first driving voltage Vo1 and a third driving voltage Vo3 corresponding to the second driving voltage Vo2. At this time, the sum of the first and third driving voltages Vo1 and Vo3 applied to the load 130 is less than a threshold voltage at which the load 130 is driven. Therefore, the load 130 is not driven.

That is, as the constant current converting unit 120 is driven and stopped, a voltage more than or less than the threshold voltage of the load 130 can be output so as to control the load 130.

In the conventional DC/DC converter, the constant current converting unit 120 receives all the driving voltages output from the power supply unit 110 and then boosts the driving voltages to output. In the DC/DC converter according to the invention, however, the constant current converting unit 120 receives only one of the driving voltages Vo1 and Vo2 output from the power supply unit 110 and then boost the driving voltage to output. Therefore, efficiency increases, and it is possible to reduce the breakdown voltage of elements provided in the constant current converting unit 120.

Figure 3:
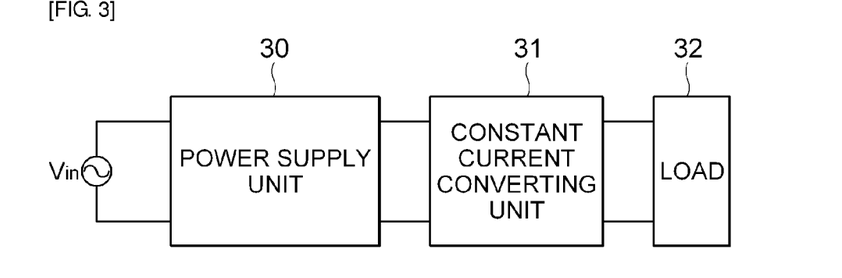

In the conventional DC/DC converter shown in FIG. 3, when it is assumed that the efficiency of the power supply unit 30 is n1 and the efficiency of the constant current converting unit 31 is n2, the total efficiency of the conventional DC/DC converter is n1·n2. In the DC/DC converter according to the invention, K % of the overall power is delivered to the load 130 from the power supply unit 110, and (1−K)% of the overall power is delivered to the constant current converting unit 120. Therefore, when it is assumed that the efficiency of the power supply unit 110 is n1' and the efficiency of the constant current converting unit 120 is n2', the total efficiency of the DC/DC converter is n1'·n2'+K(1−n2')n1'.

That is, the efficiency of the DC/DC converter according to the invention increases by K(1−n2')n1', compared with that of the conventional DC/DC converter.

Referring to FIG. 6, the DC/DC converter according to the invention will be described in more detail. Meanwhile, in the DC/DC converter according to the invention, the power supply unit 110 has a transformer T having two first and second secondary sides Ns1 and Ns2. Without being limited thereto, however, the invention can be applied to a transformer having a plurality of secondary sides.

The power supply unit 110 includes a rectification section 111, a transformer T having one primary side Np1 and two first and second secondary sides Ns1 and Ns2, first and second rectifying diodes D1 and D2, first and second smoothing capacitors Cp1 and Cp2, a PFC (Power Factor Correction) switching element Qp, and a PFC control section 112.

The power supply unit 110 may be composed of any one selected from a flyback converter, a forward converter, half-bridge converter, a full-bridge converter, and a push-full converter.

The rectification section 111 is composed of a plurality of diodes (not shown) so as to rectify the input voltage Vin. The transformer T induces the input voltage Vin, rectified by the rectification section 111, into the first and second secondary sides Ns1 and Ns2. The PFC switching element Qp is controlled by a PFC switching control signal Sp output from the PFC control section 112 so as to be grounded, and then blocks the input voltage Vin from being supplied to the first and second secondary sides Ns1 and Ns2 of the transformer T.

The PFC control section 112 is connected to the driving control unit 140 and is controlled by the first driving control signal S1 applied through the driving control unit 140 so as to output a PFC switching control signal Sp for turning off the PFC switching element Qp at the dimming-ON interval of the load 130. Then, the PFC switching element Qp is turned off. Further, the PFC control section 112 outputs a PFC switching control signal Sp for turning on the PFC switching element Qp at the dimming-OFF interval of the load 130 so as to turn off the PFC switching element Qp.

The first rectifying diode D1 connected to a high-voltage stage of the first secondary side Ns1 of the transformer T rectifies the voltage induced to the first secondary side Ns1, and the first smoothing capacitor Cp1 smoothes the voltage rectified by the first rectifying diode D1 so as to output a first driving voltage Vo1.

The second rectifying diode D2 connected to a high-voltage stage of the second secondary side Ns2 of the transformer T rectifies the voltage induced to the second secondary side Ns2, and the second smoothing capacity Cp2 smoothes the voltage rectified by the second rectifying diode D2 so as to output a second driving voltage Vo2.

The power supply unit 110 configured in such a manner can output the first and second driving voltages having a different magnitude through the first and second secondary sides Ns1 and Ns2 of the transformer T.

Further, the constant current converting unit 120 includes an inductor L, a switching element Qs, a third rectifying diode D3, a third smoothing capacitor Cp3, and a switching control section 121. The constant current converting unit 120 is connected to a low-voltage stage of the first secondary side Ns1 of the transformer T and the second secondary side Ns2 and boosts the second driving voltage Vo2 supplied from the second secondary side Ns2 so as to output a third driving voltage Vo3.

In FIG. 6, it has been exemplified that the constant current converting unit 120 is composed of a boost converter. However, the constant current converting unit 120 may be composed of any one selected from a buck converter, a buck-boost converter, a sepic converter, and a Cuk converter.

The inductor L of the constant current converting unit 120 has one end connected to the high-voltage stage of the second secondary side Ns2 of the transformer T and the other end connected to a contact between the drain of the switching element Qs and an anode of the third rectifying diode D3. The drain of the switching element Qs is grounded, and the gate of the switching element Qs is connected to the switching control section 121. The third rectifying diode D3 has a cathode connected to one end of the third smoothing capacitor Cp3, and the other end of the third smoothing capacitor Cp3 is grounded.

The switching control section 121 is connected to the load 130, the gate of the switching element Qs, and the driving control unit 140. The switching control section 121 receives a current flowing in the load 130 through a resistor R and then outputs a switching control signal Sq for turning on/off the switching element Qs.

As shown in FIGS. 7A and 7B, when the switching control section 121 receives a second control signal S2 for driving the load 130 from the driving control unit 140, the switching control section 121 outputs a low-level switching control signal Sq for boosting the second driving voltage Vo2. The switching element Qs is turned off by the low-level switching control signal Sq, and the constant current converting unit 120 boosts the second driving voltage Vo2 through the inductor L and the third smoothing capacitor Cp2 so as to output the third driving voltage Vo3. Then, the DC/DC converter supplies the first and third driving voltages Vo1 and Vo3, of which the sum is larger than the threshold voltage of the load 130, thereby driving the load 130.

When the switching control section 121 receives the second control signal S2 for stopping the driving of the load 130 from the driving control unit 140, the switching control section 121 outputs a high-level switching control signal Sq for turning on the switching element Qs. The switching element Qs is turned on by the high-level switching control signal Sq, and the constant current converting unit 120 outputs a third driving voltage Vo3 corresponding to energy charged in the third smoothing capacitor Cp3, because the supply of the second driving voltage Vo2 through the inductor L is blocked. Accordingly, the DC/DC converter supplies the first and second driving voltages Vo1 and Vo3, of which the sum is smaller than the threshold voltage of the load 130, so as to stop the driving of the load 130.

For example, it is assumed that the load 130 is composed of 54 LEDs connected in series to one another, the threshold voltage and the driving voltage of the LEDs are set to 2.5V and 3.5V, respectively, and the load 130 is operated when the condition of the driving voltage is satisfied. In this case, an LED driving voltage of 189V (3.5V×54) is required for driving (emitting) the load 130, and the load 130 is stopped (turned off) when an LED driving voltage of less than 135V is applied.

At this time, if the power supply unit 110 outputs a first driving voltage Vo1 of 80V and a second driving voltage Vo2 of 50V, the constant current converting unit 120 receives the second driving voltage Vo2 of 50V so as to control a current flowing in the load 130 to be 0.35A.

When the dimming mode is performed in the DC/DC converter, the driving control unit 140 outputs first and second driving control signals S1 and S2 for driving the power supply unit 110 and the constant current converting unit 120, and the power supply unit 110 is driven by the first driving control signal S1 so as to output the first driving voltage of 80V and the second driving voltage of 50V.

As shown in FIG. 7A, the constant current converting unit 120 is driven by the second control signal S2 and then outputs a low-level switching control signal Sq corresponding to an interval A so as to turn off the switching element Qs. Accordingly, the constant current converting unit 120 boosts the second driving voltage Vo2 so as to output the third driving voltage Vo3 of 109V. Then, as indicated by an interval C of FIG. 7B, the load 130 receives an LED driving voltage of 189V, which is the sum of the first driving voltage Vo1 of 80V and the third driving voltage Vo3 of 109V, such that 54 LEDs can be turned on.

If the dimming mode is not performed in the DC/DC converter, the driving control unit 140 outputs first and second driving control signals S1 and S2 for driving the power supply unit 110 and stopping the constant current converting unit 120. Then, the power supply unit 110 is driven by the first driving control signal S1 so as to output a first driving voltage Vo1 of 80V and a second driving voltage Vo2 of 50V.

The constant current converting unit 120 is controlled by the second control signal S2 and then outputs a high-level switching control signal Sq corresponding to an interval B so as to turn on the switching element Qs. Therefore, the constant current converting unit 120 does not receive the second driving voltage Vo2. Accordingly, the constant current converting unit 120 outputs a third driving voltage Vo3 which is approximate to 50V and is charged in the smoothing capacitor Cp3. The operation of the load 130 is stopped by the application of an LED driving voltage of 130V, as indicated by an interval D, such that the LEDs are turned off.

The DC/DC converter according to the invention can control the driving of the load 130 by controlling only the constant current converting unit 120. Accordingly, the DC/DC converter can control a voltage with a smaller magnitude than in the conventional DC/DC converter, which makes it possible to reduce the breakdown voltage of the elements provided in the constant current converting unit 120.

This can be verified through Table 1.

TABLE 1

| | Conventional DC/DC converter | Present invention | Remark |
|---|---|---|---|
| Third driving voltage | 189 V | 109 V | Decrease by 80 V |
| Power capacity of inductor | 66.15 W | 38.15 W | Decrease by 28 W |
| Total efficiency | 76.5% | 79.9% | Efficiency improvement by 3.4% |

Table 1 shows experiment values for the load 130 composed of 54 LEDs which are turned on at a driving voltage of 3.5V and are turned off at 2.5V.

As shown in Table 1, the constant current converting unit of the DC/DC converter according to the invention controls the voltage which is lower as much as 80V than in the conventional DC/DC converter. Therefore, it is possible to reduce the breakdown voltage of the elements. Further, since the power capacity of the inductor decreases by about 28W, it is possible to reduce the breakdown voltage of the inductor. The total efficiency can be improved by 3.4%.

Modifications of Constant Current Converting Unit

Hereinafter, modifications of the constant current converting unit 120 provided in the DC/DC converter according to the invention will be described with reference to FIGS. 8 to 11.

FIGS. 8 to 11 are circuit diagrams of modifications of the constant current converting unit of the DC/DC converter according to the invention.

Figure 8:
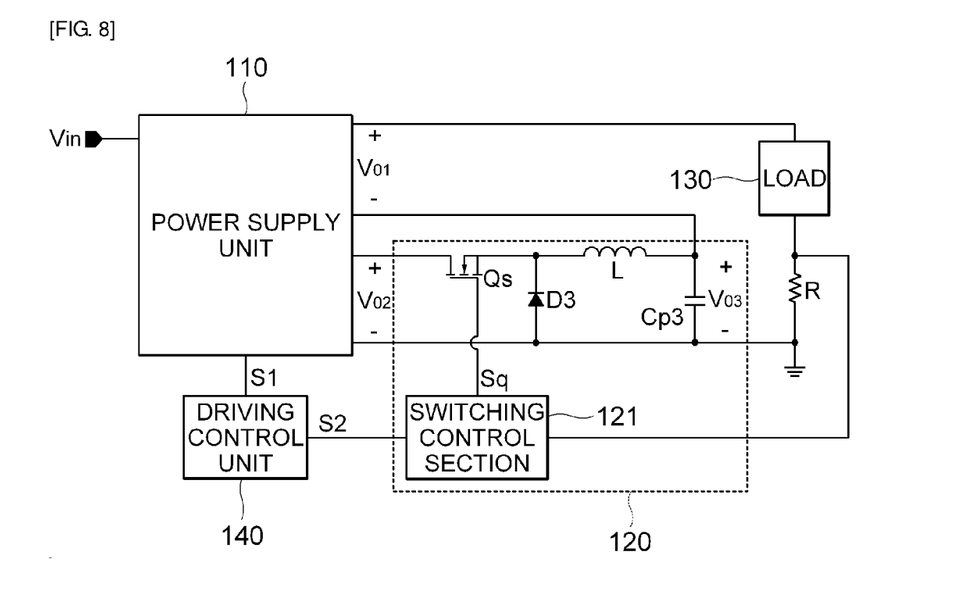
FIGS. 8 to 11 are circuit diagrams of modifications of a constant current converting unit of the DC/DC converter according to the invention.

FIG. 8 shows an example in which the constant current converting unit 120 is composed of a buck converter. As shown in FIG. 8, the constant current converting unit 120 includes the switching control section 121, the switching element Qs, the third rectifying diode D3, the inductor L, and the third smoothing capacitor Cp3.

The switching control section 121 receives a current flowing in the load 130 and is controlled by the second driving control signal S2 delivered from the driving control section 140 so as to output a switching control signal Sq for controlling the switching element Qs, thereby turning on/off the switching element Qs.

The switching element Qs has a source connected to the high-voltage stage of the second secondary side Ns2 of the transformer T of the power supply unit 110, a drain connected to a contact between the cathode of the third rectifying diode D3 and one end of the inductor L, and a gate connected to the switching control section 121. The switching element Qs is turned on/off by the switching control signal Sq applied from the switching control section 121.

The cathode of the third rectifying diode D3 is connected to a contact between the drain of the switching element Qs and the one end of the inductor L, and the anode of the third rectifying diode D3 is grounded. The one end of the inductor L is connected to a contact between the drain of the switching element Qs and the cathode of the third rectifying diode D3, and the other end thereof is connected to one end of the third smoothing capacitor Cp3. The one end of the third smoothing capacitor Cp3 is connected to a contact between the low-voltage stage of the first secondary side Ns1 of the transformer T and the other end of the inductor L, and the other end of the third smoothing capacitor Cp3 is grounded.

In the constant current converting unit 120 composed of a buck converter, when a second driving control signal S2 for driving the load 130 is applied to the switching control section 121 from the driving control unit 140, the switching control section 121 outputs a switching control signal Sq for turning on the switching element Qs.

As the switching element Qs is turned on by the switching control section Sq, the switching element Qs supplies the second driving voltage Vo2 to the inductor L. Then, the second driving voltage Vo2 is charged into the third smoothing capacitor Cp3 through the inductor L so as to be boosted. Then, the constant current converting unit 120 outputs a boosted third driving voltage Vo3.

If a second driving control signal S2 for stopping the driving of the load 130 is applied to the switching control section 121 from the driving control unit 140, the switching control section 121 outputs a switching control signal Sq for turning off the switching element Qs.

At this time, the switching element Qs is turned off by the switching control signal Sq so as to block the supply of the second driving voltage Vo2. Accordingly, the constant current converting unit 120 does not output a boosted voltage, but outputs a third driving voltage Vo3 corresponding to the energy charged in the third smoothing capacitor Cp3.

Figure 9:
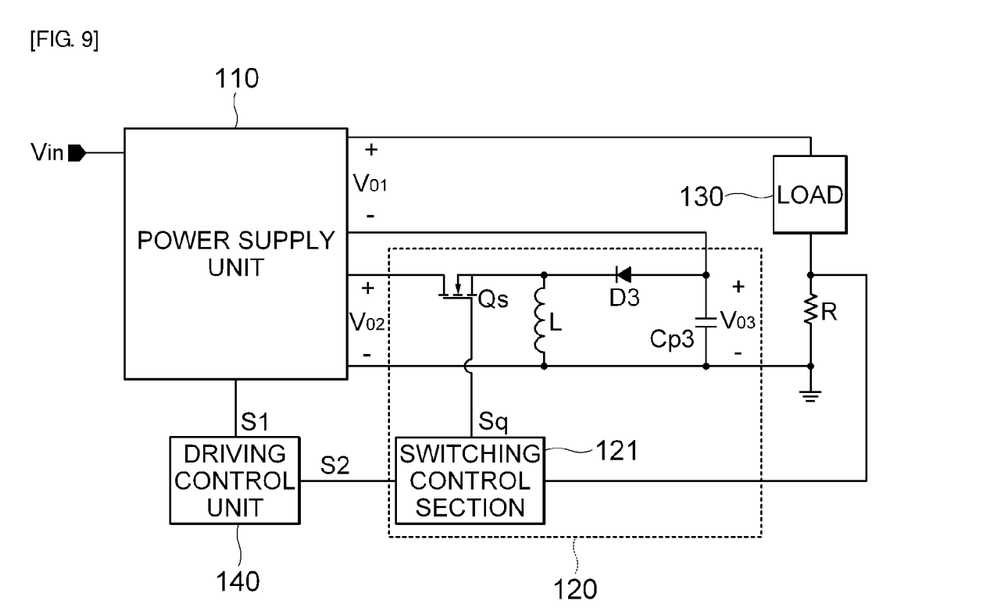

FIG. 9 shows an example in which the constant current converting unit 120 is composed of a buck-boost converter. As shown in FIG. 9, the constant current converting unit 120 includes the switching control section 121, the switching element Qs, the inductor L, the third rectifying diode D3, and the third smoothing capacitor Cp3.

The switching element Qs has a source connected to the high-voltage stage of the second secondary side Ns2 of the transformer T of the power supply unit 110, a drain connected to a contact between one end of the inductor L and the cathode of the third rectifying diode D3, and a gate connected to the switching control section 121. The switching element Qs is turned on/off by the switching control section 121.

The one end of the inductor L is connected to a contact between the drain of the switching element Qs and the cathode of the third rectifying diode D3, and the other end of the inductor L is grounded. The cathode of the third rectifying diode D3 is connected to one end of the inductor L, and the anode of the third rectifying diode D3 is connected to one end of the third smoothing capacitor Cp3.

The one end of the third smoothing capacitor Cp3 is connected to a contact between the low-voltage stage of the first secondary side Ns1 of the transformer T and the anode of the third rectifying diode D3, and the other end of the third smoothing capacitor Cp3 is grounded.

In the constant current converting unit 120 composed of a buck-boost converter, when the switching control section 121 outputs a switching control signal Sq to turn on the switching element Qs, the driving voltage Vo2 is not applied to the third smoothing capacitor Cp3, but is stored in the inductor L by the third rectifying diode D3. Accordingly, when the switching element Qs is turned on, the constant current converting unit 120 outputs a third driving voltage Vo3 which is not boosted.

When the switching element Qs is turned off, the energy stored in the inductor L is charged into the third smoothing capacitor Cp3 so as to boost the second driving voltage Vo2. Accordingly, when the switching element Qs is turned off, the constant current converting unit 120 outputs a boosted third driving voltage Vo3.

Figure 10:
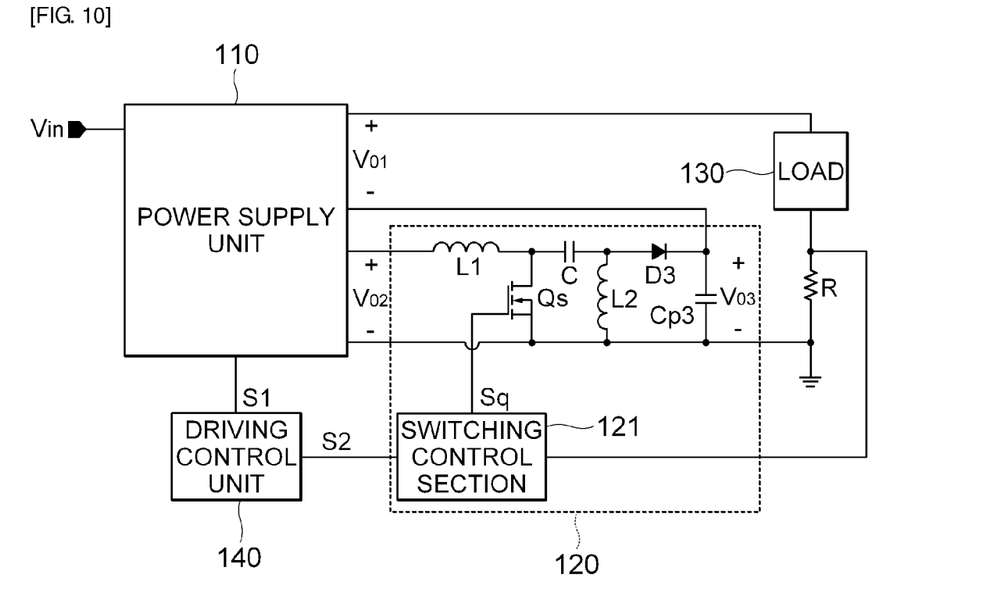

FIG. 10 shows an example in which the constant current converting unit 120 is composed of a sepic converter. As shown in FIG. 10, the constant current converting unit 120 includes the switching control section 121, a first inductor L1, the switching element Qs, a capacitor C, a second inductor L2, the third rectifying element D3, and the third smoothing capacitor Cp3.

The first inductor L1 has one end connected to the high-voltage stage of the second secondary side Ns2 of the transformer T and the other end connected to the source of the switching element Qs. The source of the switching element Qs is connected to the other end of the first inductor L1, the drain thereof is grounded, and the gate thereof is connected to the switching control section 121. The switching element Qs is turned on/off by the switching control section 121.

The capacitor C has one end connected to the other end of the first inductor L1 and the other end connected to one end of the second inductor L2. The one end of the second inductor L2 is connected to the capacitor C, and the other end thereof is grounded. Further, the third rectifying diode D3 has an anode connected to a contact between the other end of the capacitor C and the one end of the second inductor L2 and a cathode connected to one end of the third smoothing capacitor C.

The one end of the third smoothing capacitor Cp3 is connected to a contact between the low-voltage stage of the first secondary side Ns1 of the transformer T and the cathode of the third rectifying diode D3, and the other end thereof is grounded.

In the constant current converting unit 120 composed of a sepic converter, the switching element Qs is controlled by the switching control section 121 so as to boost or block the second driving voltage Vo2, thereby outputting a third driving voltage Vo3.

Figure 11:
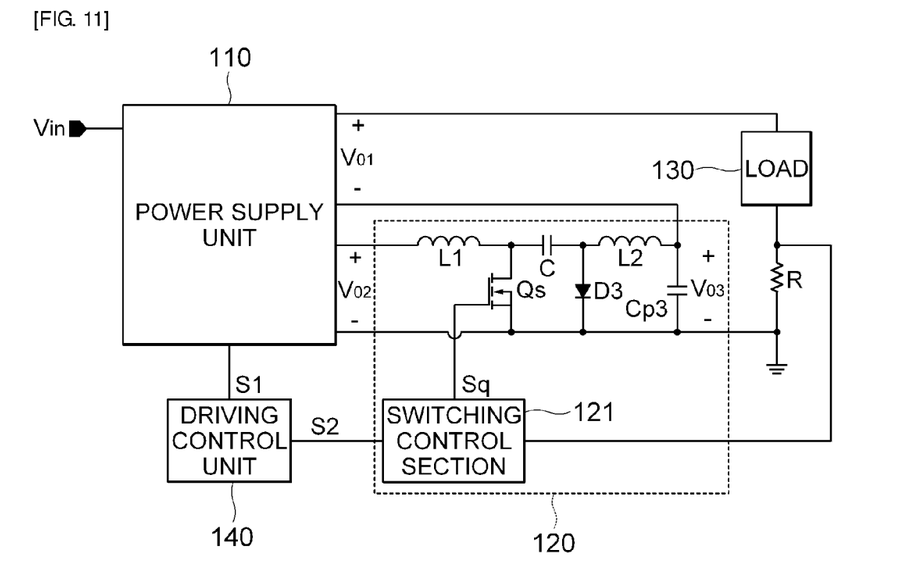

FIG. 11 shows an example in which the constant current converting unit 120 is composed of a Cuk converter. As shown in FIG. 11, the constant current converting unit 120 includes the switching control section 121, a first inductor L1, the switching element Qs, a capacitor C, the third rectifying diode D3, a second inductor L2, and the third smoothing capacitor Cp3.

The first inductor L1 has one end connected to the high-voltage stage of the second secondary side Ns2 of the transformer T and the other end connected to the source of the switching element Qs. The source of the switching element Qs is connected to a contact between the first inductor L1 and the capacitor C, the drain thereof is grounded, and the gate thereof is connected to the switching control section 121. The switching element Qs is turned on/off by the switching control section 121.

The capacitor C has one end connected to the other end of the first inductor L1 and the other end connected to a contact between the third rectifying diode D3 and the second inductor L2. The anode of the third rectifying diode D3 is connected to the other end of the capacitor C, and the cathode thereof is grounded. Further, the second inductor L2 has one end connected to a contact between the other end of the capacitor C and the anode of the third rectifying diode D3 and the other end connected to one end of the third smoothing capacitor Cp3. The one end of the smoothing capacitor Cp3 is connected to a contact between the low-voltage stage of the first secondary side Ns1 of the transformer T and the second inductor L2, and the other end thereof is grounded.

In the constant current converting unit 120 composed of a Cuk converter, the switching element Qs is turned on/off by the switching control section 121 so as to boost or block the second driving voltage Vo2.

Accordingly, as the constant current converting unit 120 outputs a boosted third driving voltage Vo3 or a third driving voltage Vo3 corresponding to energy stored in the third smoothing capacitor Cp3, only the second driving voltage Vo2 of the first and second driving voltages Vo1 and Vo2 output from the power supply unit 110 is controlled. Then, the load 130 can be easily driven or stopped.

Modifications of Power Supply Unit

Hereinafter, modifications of the power supply unit 110 provided in the DC/DC converter according to the invention will be described with reference to FIGS. 12 to 16.

FIGS. 12 to 16 are circuit diagrams showing modifications of the power supply unit of the DC/DC converter according to the invention.

Figure 12:
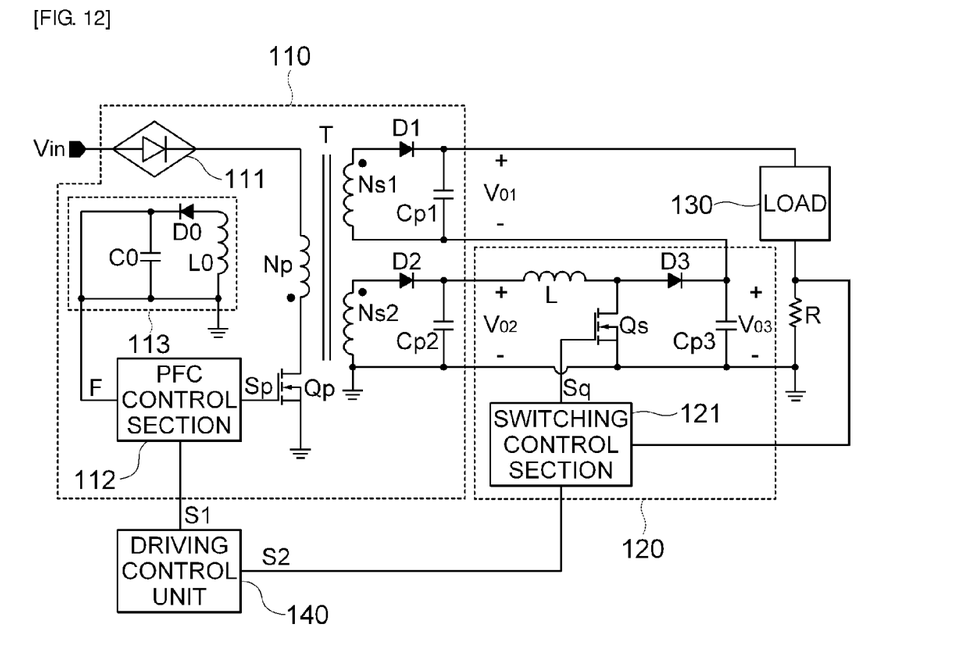
FIGS. 12 to 16 are circuit diagrams showing modifications of a power supply unit of the DC/DC converter according to the invention.

FIG. 12 shows an example in which the power supply unit 110 is composed of a flyback converter. As shown in FIG. 12, the power supply unit 110 includes a PFC switching element Qp connected to the primary side Np of a transformer T, a PFC control section 112, and a detection section 113.

The detection section 113, which is composed of an inductor L0, a diode D0, and a capacitor C0, receives a current flowing in the primary side Np of the transformer T through the inductor L0 and outputs the current as a feedback signal F through the capacitor C0 to deliver to the PFC control section 112.

When the feedback signal F delivered through the detection section 113 is lower than a preset voltage, the PFC control section 112 turns on the PFC switching element Qs. When the feedback signal F is higher than the preset voltage, the PFC control section 112 turns off the PFC switching element Qs such that a voltage with a constant magnitude is induced into the secondary side of the transformer T.

Figure 13:
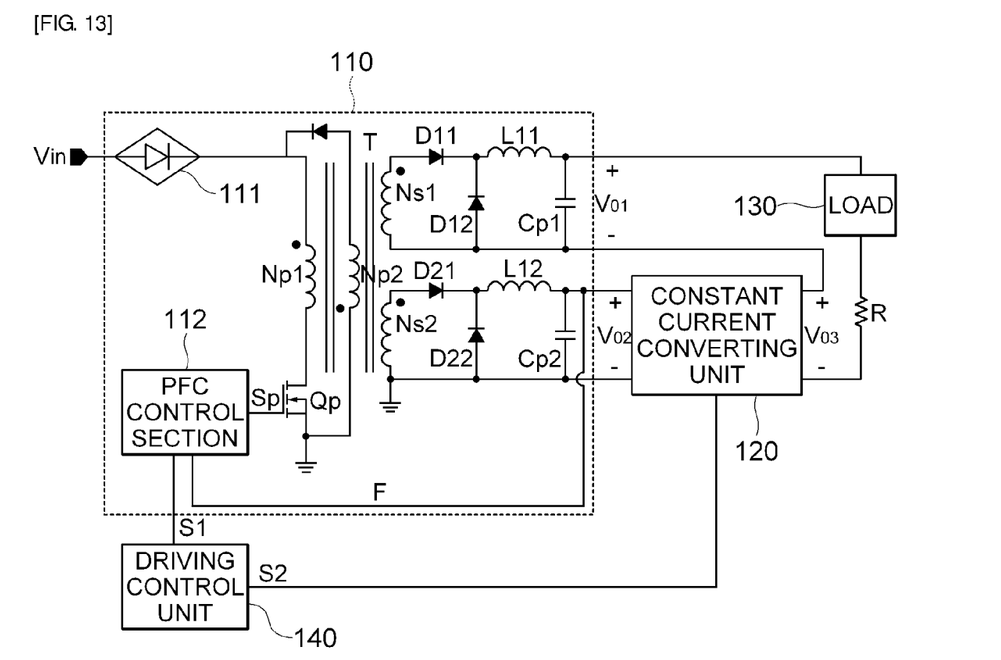

FIG. 13 shows an example in which the power supply unit 110 is composed of a forward converter. As shown in FIG. 13, the power supply unit 110 includes a rectification section 111, a transformer T having first and second primary sides Np1 and Np2, a PFC control section 112, and a PFC switching element Qp. The PFC control section 112 is connected to the high-voltage stage of the second secondary side Ns2 of the transformer T so as to receive a feedback signal F by which a current flowing in the high-voltage stage of the second secondary side Ns2 of the transformer is detected. Then, the PFC control section 112 turns on/off the PFC switching element Qp so as to supply an input voltage with a constant magnitude to the secondary side of the transformer T.

Figure 14:
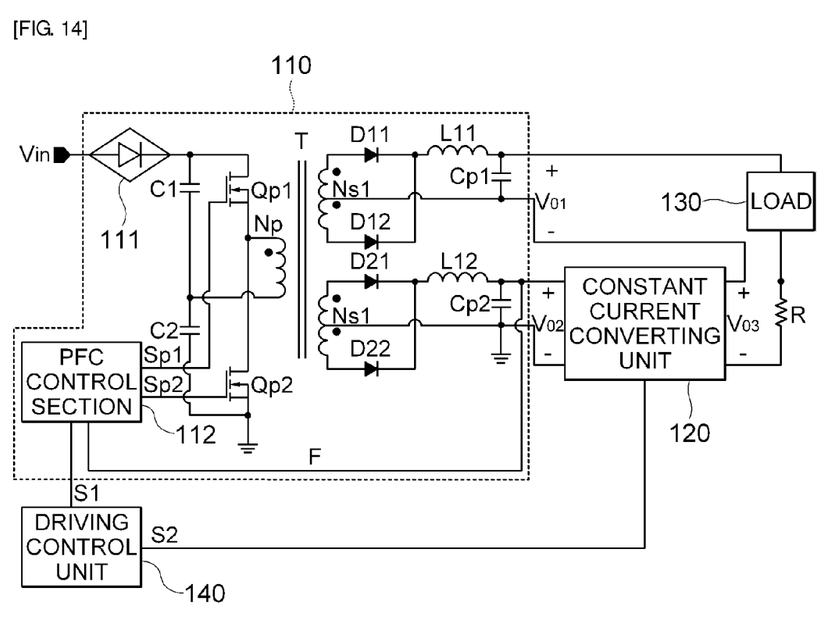

FIG. 14 shows an example in which the power supply unit 110 is composed of a half-bridge converter. In the power supply unit 110 shown in FIG. 14, the primary side Np of the transformer T is connected to first and second capacitor C1 and C2 and first and second PFC switching elements Qp1 and Qp2.

The power supply unit 110 is controlled by first and second PFC switching control signals Sp1 and Sp2 output from the PFC control section 112 connected to the gates of the first and second PFC switching elements Qp1 and Qp2, so as to supply input voltages with a constant magnitude to the secondary sides Ns1 and Ns2 of the transformer T, respectively. Then, the power supply unit 110 can output the first and second driving voltages with a constant magnitude.

Figure 15:
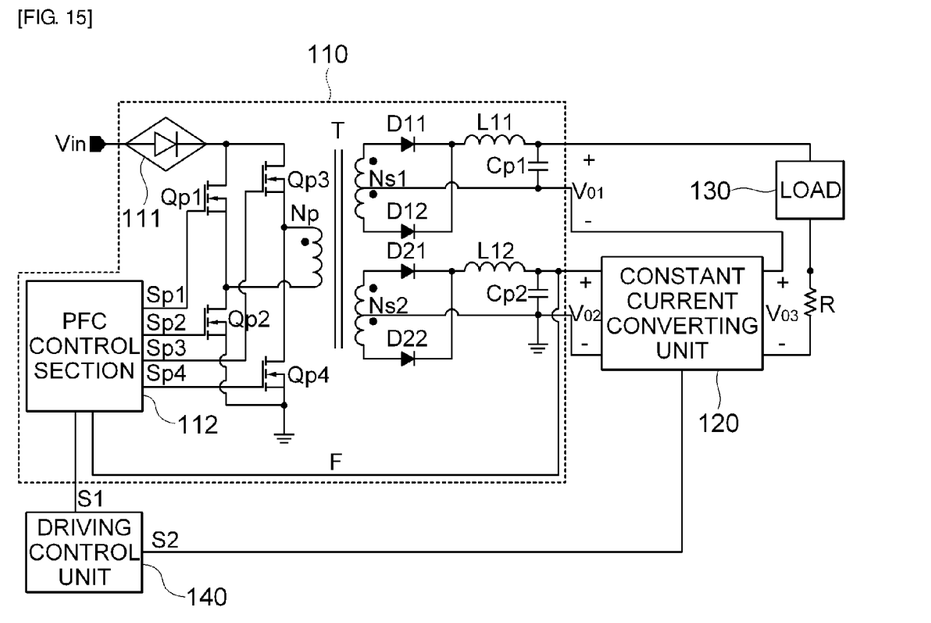

FIG. 15 shows an example in which the power supply unit 110 is composed of a full-bridge converter. In the power supply unit 110 shown in FIG. 15, the primary side Np of the transformer T of FIG. 14 is configured in a full-bridge type with first to fourth switching elements Qp1 to Qp4 such that the first and second driving voltages Vo1 and Vo2 with a constant magnitude are output.

Figure 16:
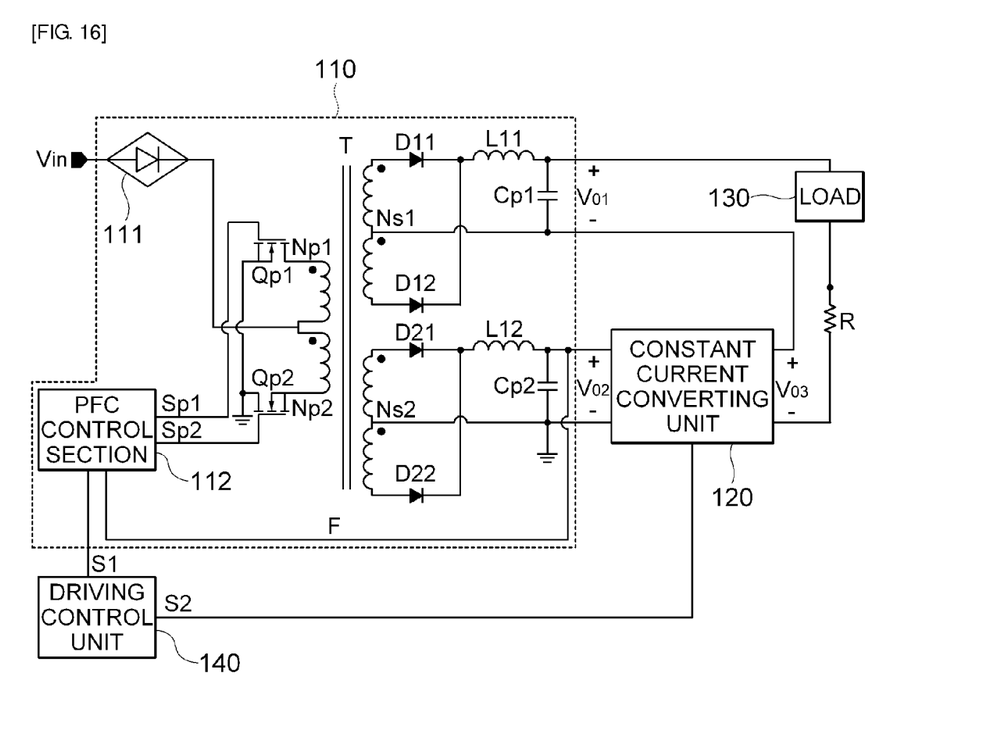

FIG. 16 shows an example in which the power supply unit 110 is composed of a push-full converter. In the power supply unit 110 shown in FIG. 16, a center tap is provided in the center of the primary sides Np1 and Np2 of the transformer T, an input voltage is applied to the center tap, and one ends of the primary sides Np1 and Np2 of the transformer T are connected to first and second PFC switching elements Qp1 and Qp2.

The PFC control section 112 receives the output driving voltage Vo2 so as to control the first and second PFC switching elements Qp1 and Qp2. Then, the power supply unit 110 outputs the first and second driving voltages Vo1 and Vo2 with a constant magnitude.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A DC/DC converter, comprising:
   a power supply unit including a transformer, the transformer including
      one primary side, and
      a plurality of secondary sides including at least a first secondary side configured to output a first voltage and a second secondary side configured to output a second voltage; and
   a constant current converting unit including
      an input port connected to the second secondary, and
      an output port including a first node connected to a first side of a load and a second node connected to a low-voltage terminal of the first secondary side, the constant current converting unit being configured to
         boost the second voltage to a third voltage that is higher than the second voltage when driving the load, and
         output a fourth voltage when not driving the load, wherein a high-voltage terminal of the first secondary side is connected to a second side of the load, so that a sum of the first voltage and the third voltage is supplied to the load when driving the load a sum of the first voltage and the fourth voltage is supplied to the load when not driving the load, the load has a turn-ON voltage such that the load is turned OFF when a voltage supplied to the load is lower than the turn-ON voltage and turned ON when the voltage supplied to the load is equal to or higher than the turn-ON voltage, and the sum of the first voltage and the third voltage is equal to or higher than the turn-ON voltage of the load, and the sum of the first voltage and the fourth voltage is lower than the turn-ON voltage of the load.

2. The DC/DC converter according to claim 1, further comprising:

a driving control unit for controlling the power supply unit and the constant current converting unit so as to drive the load or stop a driving of the load.

3. The DC/DC converter according to claim 2, wherein when stopping the driving of the load, the driving control unit is configured to deliver first and second driving control signals for controlling the power supply unit and for controlling the constant current converting unit, respectively, to the power supply unit and the constant current converting unit, respectively.

4. The DC/DC converter according to claim 3, wherein the constant current converting unit includes a smoothing capacitor including a first end defining the first node of the output port and a second end defining the second node of the output port, and when the second driving control signal for stopping the driving of the load is delivered from the driving control unit, the constant current converting unit is configured to block the second voltage supplied from the second secondary side and output the fourth voltage corresponding to an energy charged in the smoothing capacitor.

5. The DC/DC converter according to claim 3, wherein when the second driving control signal for driving the load is delivered from the driving control unit, the constant current converting unit is configured to boost the second voltage and output the third voltage.

6. The DC/DC converter according to claim 1, wherein the power supply unit comprises any one selected from the group consisting of a forward converter, a half-bridge converter, a full-bridge converter, and a push-full converter.

7. The DC/DC converter according to claim 1, wherein the constant current converting unit comprises any one selected from the group consisting of a boost converter, a buck converter, a buck-boost converter, a sepic converter, and a Cuk converter.

8. The DC/DC converter according to claim 7, wherein the constant current converting unit comprises the boost converter including:

an inductor having a first end connected to a high-voltage terminal of the second secondary side;

a switching element having a drain connected to a second end of the inductor and a source grounded;

a rectifying diode having an anode connected to the drain of the switching element;

a smoothing capacitor having a first end connected to a contact between the low-voltage terminal of the first secondary side and a cathode of the rectifying diode and a second end grounded; and a switching control section connected to a gate of the switching element for receiving a current flowing through the load so as to turn on/off the switching element.

9. The DC/DC converter according to claim 7, wherein the constant current converting unit comprises the buck converter including:

a switching element having a source connected to a high-voltage terminal of the second secondary side;

a rectifying diode having an anode grounded and a cathode connected to a drain of the switching element;

an inductor having a first end connected to a contact between the drain of the switching element and the cathode of the rectifying diode;

a smoothing capacitor having a first end connected to a contact between the low-voltage terminal of the first secondary side and the other end of the inductor and a second end grounded; and a switching control section connected to a gate of the switching element for receiving a current flowing through the load so as to turn on/off the switching element.

10. The DC/DC converter according to claim 7, wherein the constant current converting unit comprises the buck-boost converter including:

a switching element having a source connected to a high-voltage terminal of the second secondary side;

an inductor having a first end connected to a drain of the switching element and a second end grounded;

a rectifying diode having a cathode connected to the first end of the inductor;

a smoothing capacitor having a first end connected to a contact between the low-voltage terminal of the first secondary side and an anode of the rectifying diode and a second end grounded; and a switching control section connected to a gate of the switching element and for receiving a current flowing through the load so as to turn on/off the switching element.

11. The DC/DC converter according to claim 7, wherein the constant current converting unit comprises the sepic converter including:

a first inductor having a first end connected to a high-voltage terminal of the second secondary side;

a switching element having a source connected to a second end of the first inductor and a drain grounded;

a capacitor having a first end connected to a contact between the second end of the first inductor and the source of the switching element;

a second inductor having a first end connected to a second end of the capacitor and a second end grounded;

a rectifying diode having an anode connected to a contact between the first end of the second inductor and the other end of the capacitor;

a smoothing capacitor having a first end connected to a cathode of the rectifying diode and a second end grounded; and a switching control section which is connected to a gate of the switching element for receiving a current flowing through the load so as to turn on/off the switching element.

12. The DC/DC converter according to claim 7, wherein the constant current converting unit comprises the Cuk converter including:

a first inductor having a first end connected to a high-voltage terminal of the second secondary side;

a switching element having a source connected to a second end of the first inductor and a drain grounded;

a capacitor having a first end connected to a contact between the second end of the first inductor and the source of the switching element;

a rectifying diode having an anode connected to a second end of the capacitor and a cathode grounded;

a second inductor having a first end connected to a contact between the first end of the second inductor and the anode of the rectifying diode;

a smoothing capacitor having a first end connected to a second end of the second inductor and a second end grounded; and a switching control section connected to a gate of the switching element for receiving a current flowing through the load so as to turn on/off the switching element.

13. The DC/DC converter according to claim 1, wherein a power efficiency of the DC/DC converter is $n1n2+K(1-n2)n1$, where $n1$ is power efficiency of the power supply unit, $n2$ is power efficiency of the constant current converting unit, and K is percentage of power efficiency transferred from the power supply unit to the load.

14. The DC/DC converter according to claim 1, wherein the load includes a light emitting diode.

* * * * *